UNITED STATES PATENT OFFICE.

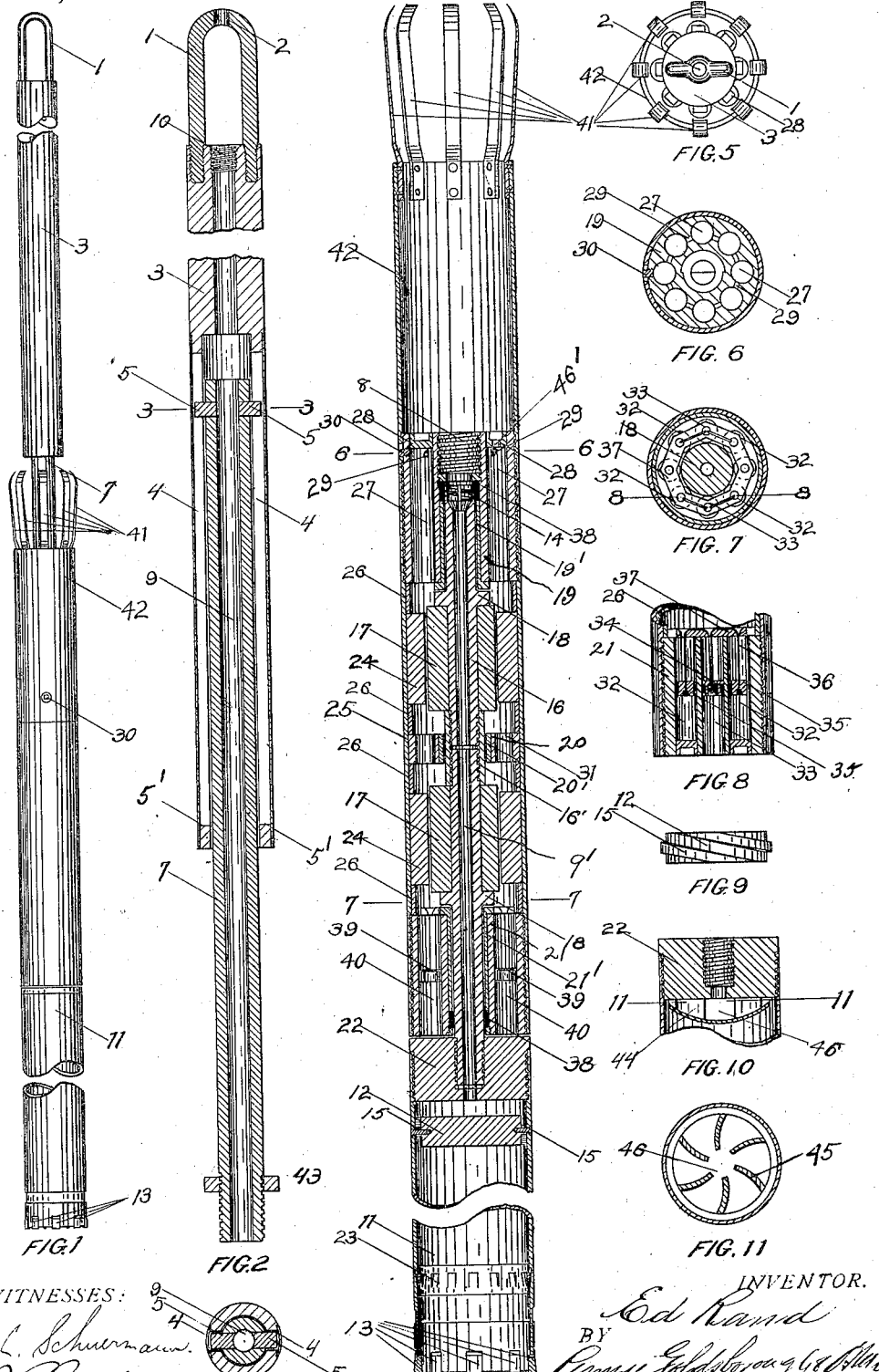

ED RAND, OF CHARLESTON, WEST VIRGINIA.

WELL-DRILLING MACHINE.

1,078,064.  Specification of Letters Patent.  Patented Nov. 11, 1913.

Application filed October 28, 1912. Serial No. 728,163.

*To all whom it may concern:*

Be it known that I, ED RAND, a citizen of the United States, residing at Charleston, in the county of Kanawha and State of West Virginia, have invented certain new and useful Improvements in Well-Drilling Machines; and I do hereby declare the following to be a full, clear, and exact description of the invention, such as will enable others skilled in the art to which it appertains to make and use the same.

This invention relates to a rotary, electrically driven drilling apparatus, in which the various parts are so related and arranged as to produce a simple, compact and efficient mechanism for driving prospect holes, oil, gas and artesian wells and the like, as will be more particularly described hereinafter, reference being had to the accompanying drawings, in which:—

Figure 1 is an elevation showing the general view of the drilling apparatus; Fig. 2 is a sectional view through the jars; Fig. 3 is a sectional view taken on the line 3—3 of Fig. 2; Fig. 4 is an enlarged vertical section through the motor, core-barrel, cutters, sludge receiver, etc.; Fig. 5 is a top plan view of the drill; Fig. 6 is a section taken on the line 6—6 of Fig. 4; Fig. 7 is a section taken on the line 7—7 of Fig. 4; Fig. 8 is a section taken on the line 8—8 of Fig. 7; Fig. 9 is an elevation of the circulating pump; Fig. 10 is a modification of the circulating pump shown in Fig. 9; Fig. 11 is a section taken on the line 11—11 of Fig. 10.

Throughout these views, like reference characters refer to corresponding parts.

Referring to the drawing, it will be noted that the apparatus includes in serial order a jar, a cylindrical casing forming a sludge bucket or receiver and a motor chamber, a core-barrel connected to the shaft of an electric motor in the motor chamber and a cutter head on the end of the core-barrel.

The casing which forms the sludge receiver and the motor chamber is shown in Fig. 4 and is designated by the numeral 25. At a suitable distance from the top of the casing 25 is secured a cylindrical bearing block 19 in which one end of the motor shaft 16 is journaled. A bearing sleeve 19' is provided between said bearing block and the journal of the shaft. The other end of the shaft 16 is journaled in a bearing block 21 secured in the lower end of the casing and provided with a bearing sleeve 21' in which the lower end of the shaft is journaled. Abutting the bearing sleeves 19' and 21' are hubs or shoulders 18 carried by the shaft 16 which serve as thrust bearings, as will hereinafter appear, and also as means for retaining motor armatures 17 in place on the shaft. The motor preferably used is of the induction type, but obviously motors of other kinds can be employed. The rotors or armatures of the motors are preferably carried directly by the shaft and are positioned in any suitable manner such as follows. The shaft 16 is made in two parts and finally connected by the sleeve 16'. Prior to this operation, however, the rotors 17, preferably of the squirrel-cage type, are forced on the shaft sections into engagement with the hubs or shoulders 18. When the sections are assembled the rotors are held rigid between the hubs 18 and the connecting sleeve 16'. A third bearing block 20 is secured in the casing and preferably positioned so that the shaft is journaled therein at the point where its two sections are connected by the sleeve 16'. A bearing sleeve 20' is interposed between the block and the sleeve 16'. The stator coils 24 which coöperate with the rotors are mounted in the casing 25 and are held in their proper positions by spacing rings 26 interposed between the bearing blocks and the stator coils. Secured to the lower end of the shaft 16 is a core-barrel 11 preferably connected to the shaft by means of the block 22. The lower end of the core-barrel is provided with the cutters 13 for cutting the material and core lifters 23, for breaking and lifting the core. Jar mechanism is provided which is shown in section in Fig. 2, and shown assembled with the 9t, complete construction in Fig. 1. In the form shown in the drawing, it consists of a reciprocable member 3 adapted to slide on the section 7. Longitudinal slots or guideways 4 are provided in the member 3, in which a projection or pin 5 carried by the section 7 is adapted to engage. The abutment 5' at the extremity of the slots 4 engages the pin 5 when the member 3 is raised, thereby causing the desired hammer blow. The lower section 7 of the jar mechanism is secured to the top bearing block 19. To accomplish this, the lower end of the section 7 is threaded and is adapted to engage a threaded portion 8 in the bearing block 19. A clamp nut

43 is preferably provided to screw down on the bearing block 19 to lock the section 7 to the bearing block. The member 3 of the jar mechanism is provided with a suitable yoke 1 to which a supporting cable can be secured. A hole 2 in the top of the yoke serves for the passage therethrough of the cable which can be fastened by means of any suitable clamp.

In order to hold the casing 25 and stator parts stationary when the apparatus is in operation, spring members are secured to a suitable part of the casing and are so arranged that they engage the walls of the well to grip the same and prevent a rotary movement of the casing. In the form shown, these spring members 41 are secured to the upper edge of the casing 25 and flare outwardly to such an extent that the walls of the well will be gripped by them to hold the casing stationary. The portions which engage the walls are curved as shown in the drawing to allow for a longitudinal movement of the casing in both directions. It is obvious that many different forms of such spring retaining members could be used which embody the same principle, for instance elliptical springs could be used secured at both ends to the casing instead of having one end free as illustrated. The number of springs 41 will depend upon the character of the material forming the walls of the well. If it is soft and sticky, then it is desirable to increase the number of springs to provide a greater bearing surface.

It is seen from the foregoing description that the hubs 18 on the shaft also serve as thrust bearings, the upper one to carry the weight of the stator parts or such part of the weight as may be desired to help feed the drill down; the lower one to stand any lifting strain that may be put on it such as the strain of breaking off the core and lifting it out of the hole. The weight of the moving parts will approximate that necessary to produce a proper pressure on the cutters so that comparatively little pressure will be on the thrust bearings when the drill is in operation. If in soft material it may be necessary to relieve the cutters of a part of this weight through the lower thrust bearing. The pressure is regulated from the surface of the ground by varying the rate of lowering the drill.

A circulation of water to the cutting means is preferably provided for as follows. The jar mechanism has a central passage 9 which is provided at its upper end with screw threads 10 in which is screwed the extremity of a suitable hose or other water conducting means. The other end of the hose is secured to the supporting cable so that it serves as a means for conducting clean and cool water from a relatively high point in the well down to the drilling apparatus. The shaft 16 in the preferred form is also provided with a central passage 9' as clearly shown in Fig. 4. Suitable packing glands 38 are positioned next to the bearing sleeves 19' and 21' to prevent the dirt and water from working into the bearings. Means is preferably provided near the upper end of the shaft to force the water downwardly therethrough. This means may take the form of a spiral 14 arranged in the bore 9' of the shaft, which acts as a small screw propeller and forces the water down through the shaft into the core-barrel. A second and larger pump is preferably arranged in the core-barrel to receive the water coming from the shaft and to force it down between the core and core-barrel past the cutters and up around the outside of the casing to a higher point in the well where it mixes with the other water cooled off, loses a part of its sediment by settlement and becomes a part of the circulating water again. The larger pump referred to may be of any form, but, preferably, it consists of a body portion 12 having spirally arranged blades 15, which act as a propeller to force the water downward. A modification of the pump 12 is shown in Figs. 10 and 11. It is of the centrifugal type and is provided with radial vanes 45 which act on the water after it has entered the space 46 to force it forward. The upper portion 42 of the casing 25 forms a sludge receiver as clearly shown in Fig. 4. It serves to catch the cuttings which settle from the circulating water.

It is obvious that in drilling deep wells, the apparatus will be submerged in water and subjected to enormous pressures, which must be equalized or else the circulating water would be forced in past the bearings into the motor chamber. Such pressures would also tend to collapse the casing. This problem is completely and satisfactorily solved by filling the motor chamber with a suitable fluid. Preferably, the fluid is a lubricant. Means are interposed between the fluid and the water on the outside such that the pressure on the outside will be permitted to compress the fluid on the inside or excess of pressure on the inside will immediately be relieved by expansion toward the outside through the interposed medium. Means for so equalizing the pressures are shown in the drawings, but the principle can be carried out in numerous modifications not illustrated.

In the drawings, the bearing blocks are all provided with longitudinal bores or openings, the block 19 having the bores 27 provided at their upper ends with suitable closures 28. Small interconnecting passages 29 serve to conduct any escape of gases from one bore to the next and finally to the plug 30, which when removed, allows such gases to escape. The plug 30 also serves as means for filling the casing with the fluid. By such a construction of the block, the fluid is permitted to rise to the top of the block through the longitudinal openings or bores. The middle bearing block 20 is also provided with longitudinal openings 31 through which the fluid is free to pass. The lower block has similar openings 40 into which the fluid is free to pass at their upper ends. By interposing diaphragms 39 in the openings 40, it is obvious that the external water under pressure has free access in the lower part of the openings 40 and is allowed to contact with the said diaphragms. When the external pressure is in excess of the pressure of the fluid on the inside of the casing, the pressure acting through the diaphragms will tend to compress the internal fluid and thereby equalize the pressure. Another form of equalizing means is shown in Fig. 8. In this form the openings 32 are closed at their lower ends and the remaining openings 33 are open to the outside water. A sliding piston 34 is adapted to slide in the openings 33 so that excessive external pressures will move the pistons upwardly and compress the internal fluid and vice-versa. To facilitate the movement of the pistons, counterweights 35 are preferably provided which are freely movable in the openings 32. Connecting cords 36 run over a suitable hanger 37 at the top of the bearing block as clearly shown in Figs. 7 and 8.

It is to be understood that the pressures between the internal fluid and external liquids can be equalized by any suitable means, the two described being merely examples. It is not necessary to locate the equalizing means as shown in the drawings. Any suitable location may be used where a free connection between the two fluids can be obtained.

When a lubricant is used as the internal fluid, it serves the purpose of also lubricating the bearings and rotary parts, thereby dispensing with additional means for accomplishing this purpose.

Numerous advantages follow from the use of an induction motor in the above relation. As no brushes or commutators are required, no friction results from contacting parts to produce heat. The parts can be conveniently positioned in the casing and notwithstanding the small space allowed for the motor, it furnishes sufficient power to produce a high efficiency.

The conductors to supply the current to the motor or motors, as the case may be, preferably form the core of the supporting cable being thereby satisfactorily protected. They are run through a suitable opening 46' provided in one of the closures 28 for the purpose, and then connected to the stator coils of the motor.

The operation of the apparatus is as follows: The drill is connected to a hoisting drum by means of a cable passing over a sheave wheel at the top of a derrick frame or tripod. The core of the hoisting cable being the electrical conductors is connected to a source of power through a switch, ammeter and any other electrical devices which may be necessary. The drill ends of the conductors are suitably connected to the motor windings. The drill is then suspended by the cable and the upper or stator part held by suitable means to prevent turning. Water connection is made to the drill which may be from any temporary source of supply. Current is furnished to the motor and the core-barrel revolves causing the teeth to cut as the drill is lowered. When a depth has been reached corresponding to the length of the core-barrel, the drill is hoisted and the core removed. The drill is again lowered and operated until another core has been cut to sufficient length when it is again hoisted and the core removed, this process being repeated to any desired depth.

When drilling through material which is difficult to cut, the ammeter will register an increased flow of current, and the rate of feeding the drill downwardly may, therefore, be decreased. If soft material is being cut, however, the rate of feeding the drill downwardly can be increased to get the maximum work out of the drill. By watching the ammeter and varying the rate of feeding the drill downwardly, the work gotten out of the machine can be kept constant.

When the drill has completely entered the ground, it will be no longer necessary to hold it to prevent turning as the springs will automatically grip the well walls and prevent rotation of the casing.

It will be necessary to keep a supply of water in the well for circulation through the drill but after a reasonable depth has been reached, water will be encountered and the circulation pumps of the drill will take care of all circulating water.

What I claim is:—

1. In an apparatus for drilling wells and the like, the combination of a casing, a rotatable shaft mounted therein, cutting means secured to said shaft, an electric motor in said casing to rotate said shaft, a body of fluid in said casing, and means for transmitting the pressure external to said casing to said body of fluid.

2. In an apparatus for drilling wells and the like, the combination of a casing, a rotatable shaft mounted therein, cutting means secured to said shaft, an induction motor in said casing to rotate said shaft, said motor comprising a stator secured to said casing and a rotor secured to said shaft, means in said casing to retain a body of fluid having free circulation around said motor, and means for transmitting the pressure external to said casing to said body of fluid.

3. In an apparatus for drilling wells and the like, the combination of a casing, a rotatable shaft mounted therein, cutting means secured to said shaft, a motor in said casing to rotate said shaft, means to retain a body of fluid in said casing, and yielding pressure-transmitting means in connection with the casing to equalize the external pressure and the pressure of said fluid.

4. In an apparatus for drilling wells and the like, the combination of a casing, a rotatable shaft mounted therein, cutting means secured to said shaft, a motor in said casing to rotate said shaft, means to retain a body of fluid in said casing, and means to equalize the external pressure and the pressure of said fluid.

5. In an apparatus for drilling wells and the like, the combination of a casing, a rotatable shaft journaled therein, cutting means secured thereto, a central passage in said shaft to conduct circulating fluid to said cutting means, means actuated by said shaft to establish the flow of liquid through said shaft and to the cutting means, and a motor in said casing to rotate said shaft.

6. In an apparatus for drilling wells and the like, the combination of a casing, a rotatable shaft journaled therein, cutting means secured thereto, a central passage in said shaft to conduct circulating liquid to said cutting means, jar mechanism secured to said casing and provided with a central passage running longitudinally of said jar mechanism and in communication with the passage in said shaft, means actuated by said shaft to establish a flow of liquid through said jarring mechanism and said shaft, and a motor in said casing to rotate said shaft.

7. In an apparatus for drilling wells and the like, the combination of a casing, a rotatable shaft mounted therein, stator elements secured to the casing, rotor elements carried by said shaft, cutting means operated by said shaft, jar mechanism associated with the casing, said jar mechanism and said shaft having longitudinally alined passages for conducting a circulating liquid to the cutting means, means for causing the flow of liquid through said passages, means to retain a body of fluid which surrounds said motor parts, and means to equalize the pressure between said fluid and said circulating liquid.

8. An apparatus for drilling wells and the like, comprising a casing, cutter operating mechanism located in the lower part thereof, the upper part adapted to serve as a sludge receiver, and spring members secured to the upper end of the casing and adapted to engage the walls of the well to prevent said casing from rotating.

9. An apparatus for drilling wells and the like, comprising a casing, bearing blocks associated with said casing, a rotatable cutter shaft journaled in said bearing blocks, and jar mechanism connected with one of said bearing blocks.

10. An apparatus for drilling wells and the like, comprising a casing, a bearing block situated intermediate the ends of said casing, a second bearing block associated with said casing, a rotatable cutter shaft journaled in said bearing blocks, the upper part of said casing above the first-named block serving as a sludge receiver, and jar mechanism extending into said casing and connected to said first-named bearing block.

11. An apparatus for drilling wells and the like, comprising a casing, bearing blocks associated with said casing, a rotatable cutter shaft journaled in said bearing blocks, said shaft provided with shoulders adapted to abut said bearing blocks to prevent longitudinal movement of said shaft relative to the casing, and jar mechanism connected to one of said bearing blocks.

12. An apparatus for drilling wells and the like, comprising a casing, a rotatable cutter shaft journaled therein, cutting mechanism associated with said shaft, and jar mechanism associated with said apparatus, said shaft and jar mechanism having longitudinal passages through which liquid may be supplied to the cutting mechanism.

13. An apparatus for drilling wells and the like, comprising a casing, bearing blocks positioned in said casing, a rotatable cutter shaft journaled in said bearing blocks, and pressure transmitting means associated with one of said bearing blocks.

14. An apparatus for drilling wells and the like, comprising a casing, bearing blocks positioned in said casing, said bearing blocks provided with longitudinal openings therein, said openings provided with closures to retain a body of fluid in said casing, a rotatable cutter shaft journaled in said bearing blocks, and means interposed in the longitudinal openings of one of said bearing blocks to equalize the pressure of said fluid in the casing and the pressures external to the casing.

In testimony whereof I affix my signature, in presence of two witnesses.

ED RAND.

Witnesses:
  B. R. WINKLER,
  RUTH MELMAN.